(12) United States Patent     (10) Patent No.: US 9,319,758 B2
Goswami et al.     (45) Date of Patent: Apr. 19, 2016

(54) METHOD AND SYSTEM FOR PROTECTION SWITCHING IN ETHERNET PASSIVE OPTICAL NETWORKS

(75) Inventors: Sanjay Goswami, Santa Rosa, CA (US);
Lawrence D. Davis, Petaluma, CA (US);
Edward W. Boyd, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 915 days.

(21) Appl. No.: 12/565,680

(22) Filed: Sep. 23, 2009

(65) Prior Publication Data
US 2010/0098407 A1    Apr. 22, 2010

Related U.S. Application Data

(60) Provisional application No. 61/107,251, filed on Oct. 21, 2008.

(51) Int. Cl.
*H04B 10/032* (2013.01)
*H04Q 11/00* (2006.01)
*H04B 10/272* (2013.01)

(52) U.S. Cl.
CPC ......... *H04Q 11/0067* (2013.01); *H04B 10/032* (2013.01); *H04B 10/272* (2013.01); *H04J 2203/006* (2013.01); *H04Q 2011/0081* (2013.01)

(58) Field of Classification Search
USPC .......................................................... 398/5
See application file for complete search history.

(56) References Cited

U.S. PATENT DOCUMENTS

| 7,634,160 | B2 * | 12/2009 | Li et al. ............................ 385/24 |
| 2002/0030865 | A1 * | 3/2002 | Kawate et al. ................ 359/110 |
| 2002/0071149 | A1 * | 6/2002 | Xu et al. ........................ 359/110 |
| 2005/0008362 | A1 | 1/2005 | Jung et al. |
| 2008/0037981 | A1 | 2/2008 | Mukojima |
| 2008/0131124 | A1 * | 6/2008 | Nam et al. ...................... 398/67 |
| 2008/0138063 | A1 * | 6/2008 | Akasaka et al. ................ 398/4 |
| 2008/0152342 | A1 | 6/2008 | Hung et al. |
| 2009/0067835 | A1 * | 3/2009 | Chen ............................... 398/45 |
| 2010/0098407 | A1 | 4/2010 | Goswami et al. |

FOREIGN PATENT DOCUMENTS

| WO | WO2006/116895 | * 11/2006 | ............... G02B 6/28 |
| WO | WO 2010/047950 A2 | 4/2010 | |

OTHER PUBLICATIONS

International Search Report directed to related International Patent Application No. PCT/US2009/059787, Korean Intellectual Property Office, Daejeon, Korea, mailed Apr. 20, 2010, 3 pages.
Written Opinion directed to related International Patent Application No. PCT/US2009/059787, Korean Intellectual Property Office, Daejeon, Korea, mailed Apr. 20, 2010, 3 pages.
International Preliminary Report on Patentability directed to related International Patent Application No. PCT/US2009/059787, The International Bureau of WIPO, Geneva, Switzerland, issued Apr. 26, 2011, 1 page.

* cited by examiner

*Primary Examiner* — Shi K Li
(74) *Attorney, Agent, or Firm* — Sterne, Kessler, Goldstein & Fox P.L.L.C.

(57) ABSTRACT

One embodiment provides a system that performs protection switching in an Ethernet passive optical network (EPON), which includes an optical line terminal (OLT) and at least one optical network unit (ONU). The system is configured with at least one redundant component for the OLT and/or ONUs, wherein the redundant component can be optical or electrical, and can be a port, line card or link. The system provides protection by detecting a failure, and switching automatically to the redundant components to reduce service disruption time. The protection switching comprises: preserving the existing configuration over the loss of at least one of a multiple-point control protocol (MPCP) message; an operations, administration and maintenance (OAM) message; and a signal on the physical layer. The system recovers from the failure without performing ONU discovery.

24 Claims, 16 Drawing Sheets

METHOD AND SYSTEM FOR PROTECTION SWITCHING IN ETHERNET PASSIVE OPTICAL NETWORKS

RELATED APPLICATION

This application hereby claims priority under 35 U.S.C. §119 to the following provisional patent application: U.S. Provisional Patent Application No. 61/107,251 filed on 21 Oct. 2008, entitled "Protection Switching in Passive Optical Networks," by inventors Sanjay Goswami, Lawrence D. Davis, and Edward W. Boyd.

BACKGROUND

1. Field of the Invention

This disclosure is generally related to the design of Ethernet passive optical networks. More specifically, this disclosure is related to the design of protection switching in Ethernet passive optical networks.

2. Related Art

In order to keep pace with increasing Internet traffic, network operators have widely deployed optical fibers and optical transmission equipment, substantially increasing the capacity of backbone networks. A corresponding increase in access network capacity, however, has not matched this increase in backbone network capacity. Even with broadband solutions, such as digital subscriber line (DSL) and cable modem (CM), the limited bandwidth offered by current access networks still presents a severe bottleneck in delivering high bandwidth to end users.

Among different competing technologies, Ethernet passive optical networks (EPONs) are one of the best candidates for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. The "first mile" is generally a logical point-to-multipoint network, where a central office serves a number of subscribers. For example, an EPON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within an EPON are performed between an optical line terminal (OLT) and optical network units (ONUs). The OLT generally resides in the central office and couples the optical access network to a metro backbone, which can be an external network belonging to, for example, an Internet Service Provider (ISP) or a local exchange carrier. An ONU can reside either at the curb or at an end-user location, and can provide broadband voice, data, and video services. ONUs are coupled to a one-by-N (1×N) passive optical coupler, where N is the number of ONUs, and the passive optical coupler is coupled to the OLT over an optical link. One may use a number of cascaded optical splitters/couplers to increase the number of ONUs. This configuration can significantly save on the number of fibers and amount of hardware.

Communications within an EPON include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more logical link identifiers (LLIDs), and a data packet transmitted by the OLT typically specifies the LLID of the destination ONU. In the upstream direction, the ONUs need to share channel capacity and resources, because there is only one link coupling the passive optical coupler to the OLT.

Deployment of EPON-based access networks carrying critical services like video and VoIP demands the networks to be up all the time. EPONs, by design, have no active components between the central office and subscribers. This provides carriers a huge advantage when it comes to keeping the networks up and running. Still, other parts of the network need to be protected. Fiber trunks are susceptible to failure either because of fiber cuts or unacceptable signal degradation. Optical components like lasers degrade or fail over time, leaving services down for undesirable durations. The electrical components on the OLT line card and ONUs are also susceptible to complete failures. Therefore, carriers often have to plan for redundant systems. Protection switching is central to redundant networks. Without automatic protection the service disruption times can be anywhere from a few minutes to a few days.

SUMMARY

One embodiment provides a system that performs protection switching in an Ethernet passive optical network (EPON), which includes an optical line terminal (OLT) and at least one optical network unit (ONU). The system is configured with at least one redundant component for the OLT and/or ONUs in the EPON, wherein the redundant component can be optical or electrical, and can be a port, line card or link. The system provides protection by detecting a failure and switching automatically to the redundant components to reduce service disruption time. The protection switching includes: preserving existing configuration over the loss of at least one of a multiple-point control protocol (MPCP) message, an operations, administration and maintenance (OAM) message, and a signal on the physical layer. The system then configures the standby components with preserved configurations to recover network operation.

In a variation of this embodiment, configuring the OLT comprises performing at least one of the following operations: configuring two transceivers coupled to the OLT end of an optical fiber for link protection; configuring two ports for port protection, wherein the working and protected ports may reside on a single OLT chip, or on a single OLT line card but different OLT chips, or on different OLT line cards; configuring a backup port and one or more working ports for port protection, wherein the backup port can protect any of the working ports; configuring a standby line card and one or more working line cards for line card protection, wherein the standby line card can protect any of the working line cards; and switching upstream traffic to a protected uplink port for uplink port protection.

In a variation of this embodiment, configuring the ONU comprises performing at least one of the following operations: configuring two transceivers coupled to the ONU end of an optical fiber for link protection; configuring two ports for port protection, wherein the working and backup ports reside on a single ONU, or on different ONUs coupled by a switch; configuring a 1-by-2 optical switch with one port coupled to the ONU and the other two ports coupled to the working and backup fibers, respectively.

In a further variation, the working and backup ports reside on a single ONU, wherein the system is configured to support duplicating ONU traffic on both the working and backup ports.

In a further variation, the working and backup ports reside on a single ONU, wherein the system is configured to detect failure on the working port and switch to the backup port and monitor optical signal on the backup port to report backup path failure to the ONU.

In a further variation, the system supports configuring both the working and backup ports to be in operation mode, and shares normal traffic load between the working and backup ports.

In a variation of this embodiment, the system preserves existing OLT and ONU configurations and configures the standby components with common configurations to reduce protection-switching time.

In a variation of this embodiment, the system provisions the network with balanced trunk paths to avoid range adjustment in protection switching.

In a variation of this embodiment, performing critical link configuration by the system comprises applying range offset for protected path, and direct registration with prioritized service discovery. The working OLT and the backup OLT can take turns to perform ranging, or perform ranging simultaneously with the transmission laser in the backup OLT turned off.

In a further variation, the system is configured to maintain an OLT Internet protocol multicast (IPMC) proxy, which is configured to allow downstream IPMC traffic to flow without any restriction when switching occurs; build a multicast group database by sending startup queries to discover multicast groups currently used by ONUs; and return to a normal operation mode.

In a variation of this embodiment, the system is further configured to perform protection switching on demand in response to a protection-switching command.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The operation procedures described in this detailed description may be stored on a digital-circuit readable storage medium, which may be any device or medium that can store code and/or data for use by digital circuits. This includes, but is not limited to, application-specific integrated circuits (ASICs), field-programmable gate arrays (FPGAs), semiconductor memories, magnetic and optical storage devices such as disk drives, magnetic tape, and CDs (compact discs) and DVDs (digital versatile discs or digital video discs).

Passive Optical Network Topology

Figure 1:
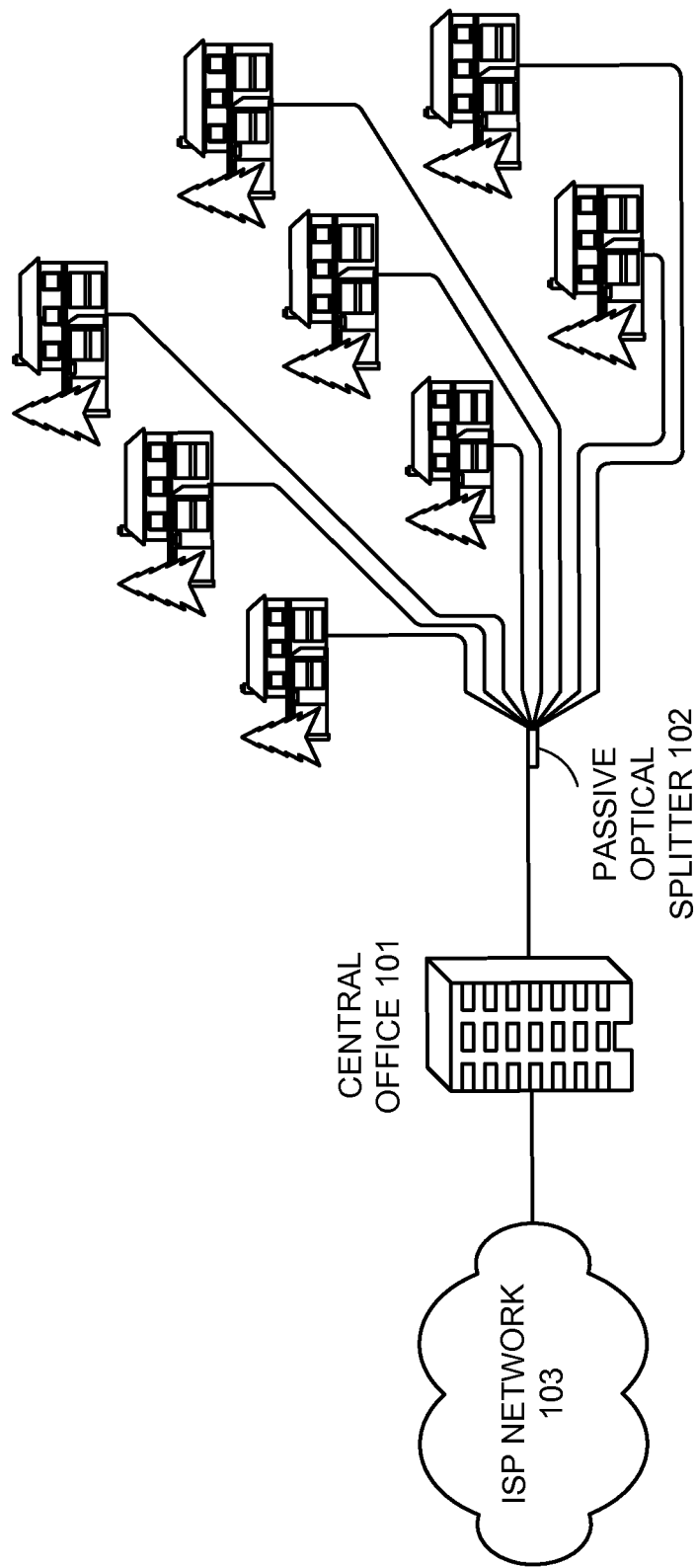
FIG. 1 illustrates an EPON, wherein a central office and a number of subscribers are coupled through optical fibers and a passive optical splitter (prior art).

FIG. 1 illustrates a passive optical network including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

EPON Protection with Optical Switch

Figure 2:
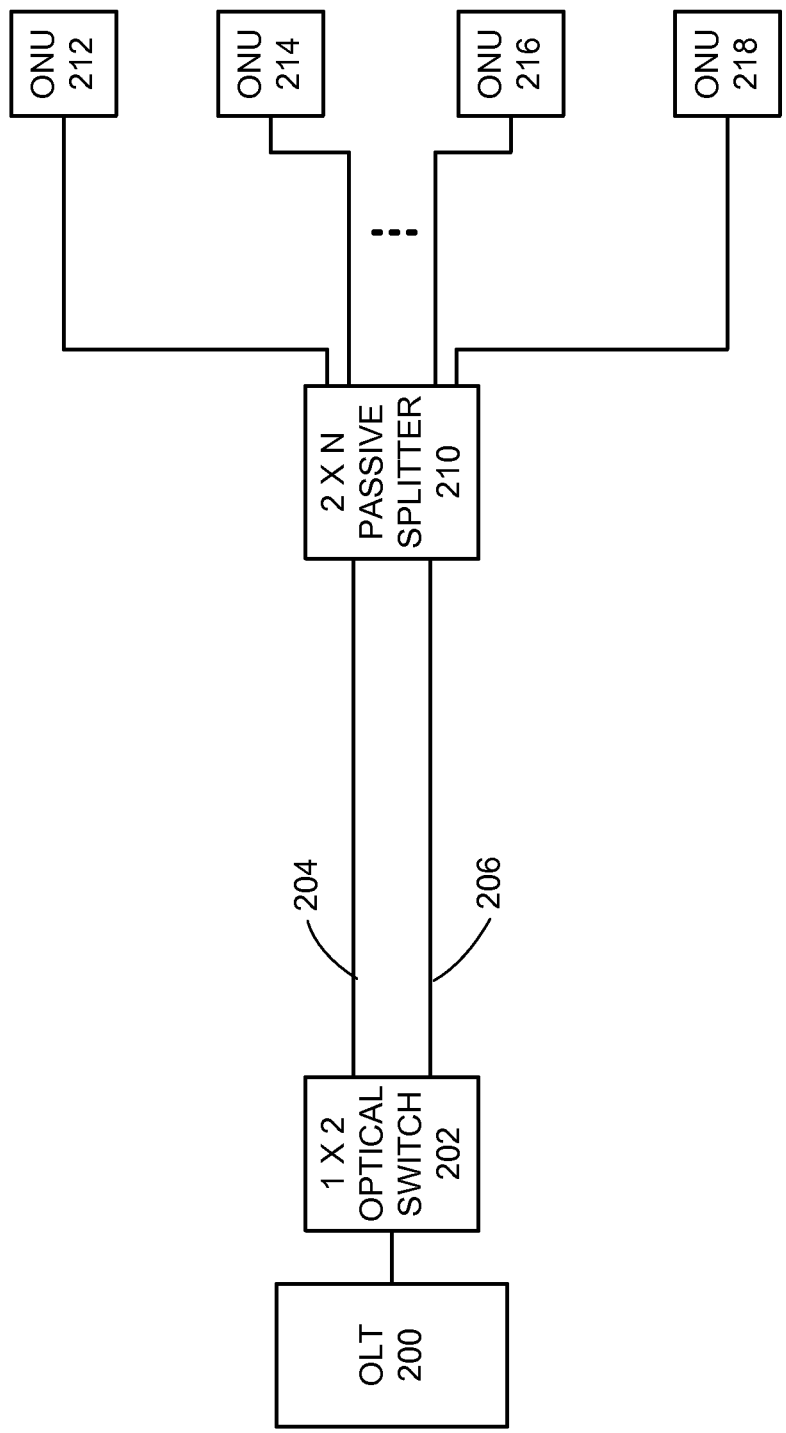
FIG. 2 illustrates a 1:1 fiber link protection scheme using an optical switch in accordance with an embodiment of the present invention.

FIG. 2 illustrates fiber link protection achieved by using two trunk fibers 204 and 206 to couple an OLT 200 at the central office to a 2×N passive splitter 210 which is coupled with ONUs 212, 214, 216, and 218 through optical fibers. One of trunk fibers 204 and 206 functions as a working link, and the other works as a backup link. The trunk fibers ideally take geographically diverse paths for protection purposes. A 1×2 optical switch 202 provides the protection switching to the backup trunk fiber when a link failure on the working trunk fiber is detected. This topology provides 1:1 protection for the fiber link.

Figure 3:
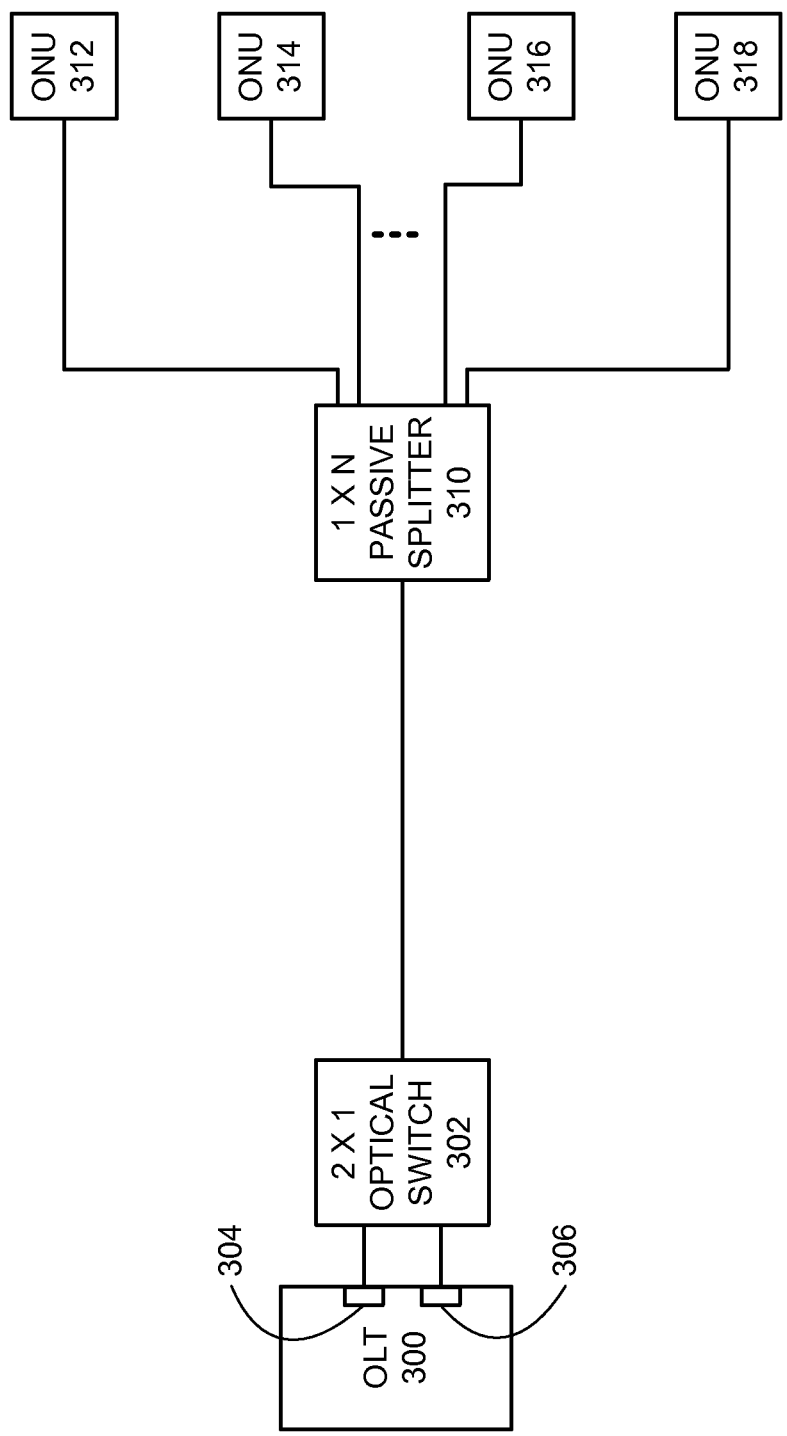
FIG. 3 illustrates a 1:1 OLT port protection scheme using an optical switch in accordance with an embodiment of the present invention.

Lasers on the OLT ports are susceptible to aging or degradation. FIG. 3 illustrates port protection for a working port 304 with a backup port 306 on an OLT 300. A 2×1 optical switch 302 switches over to backup port 306 when a failure on working port 304 is detected. Since there is only a single fiber link coupling optical switch 302 to a 1×N passive optical splitter 310, which is coupled with ONUs 312, 314, 316 and 318, this topology provides 1:1 protection for the laser and electrical components on the OLT.

Figure 4:
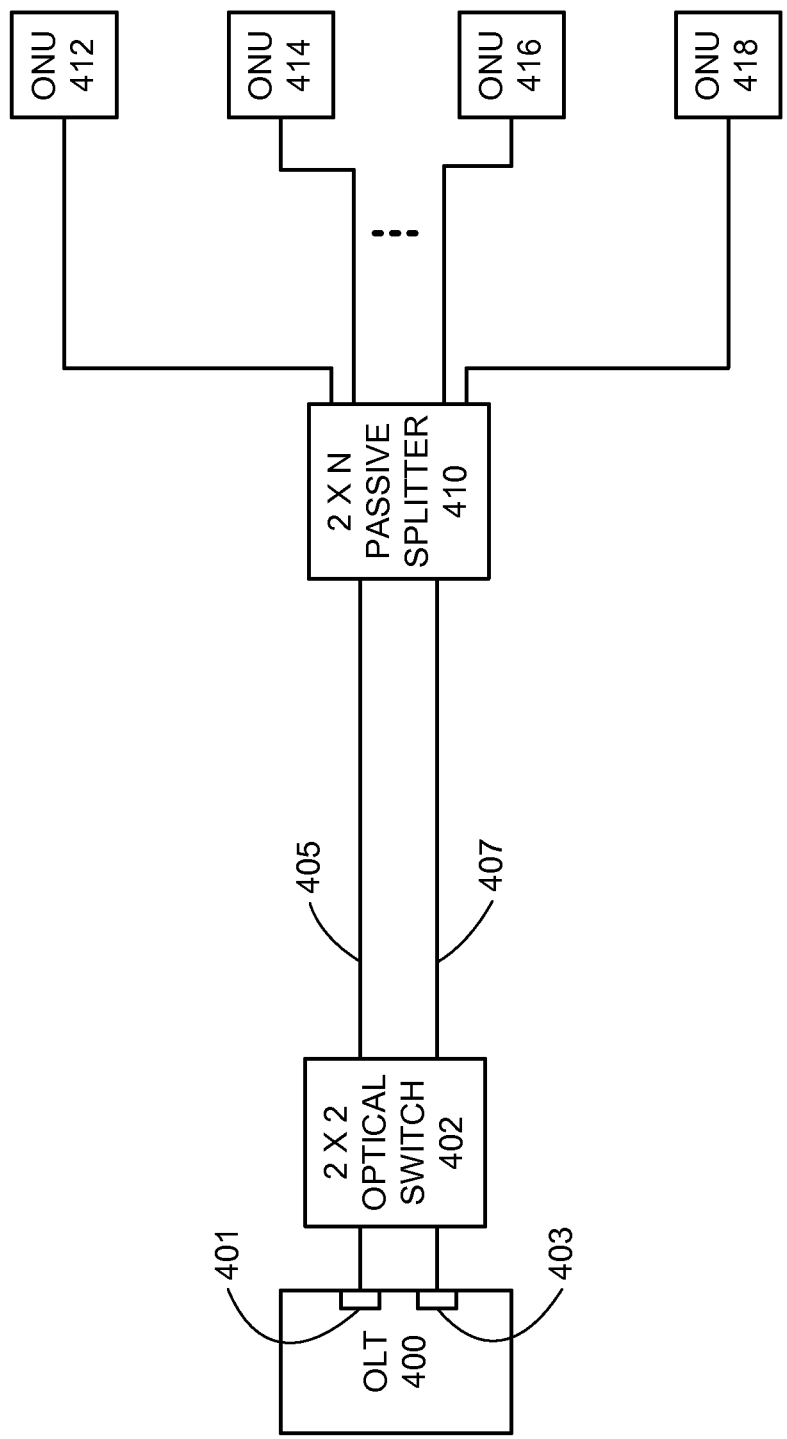
FIG. 4 illustrates a 1:1 fiber link and OLT port protection scheme using an optical switch in accordance with an embodiment of the present invention.

By combining the protection configuration shown in FIG. 2 and FIG. 3, one can achieve 1:1 OLT port and fiber link protection. FIG. 4 illustrates a combined topology with a working port 401, a backup port 403, a working trunk fiber 405, and a backup trunk fiber 407. A 2×2 optical switch 402 provides the protection switching to backup port 403 when a failure on working port 401 is detected. Furthermore, two trunk fibers 405 and 407 are used to couple 2×2 optical switch 402 at the central office to a 2×N passive splitter 410 which is coupled with ONUs 412, 414, 416, and 418. 2×2 optical switch 402 provides protection switching to backup trunk fiber 407 when a link failure on working trunk fiber 405 is detected. This topology provides 1:1 protection for the laser and electrical components on the OLT port, as well as for the fiber link.

Figure 5:
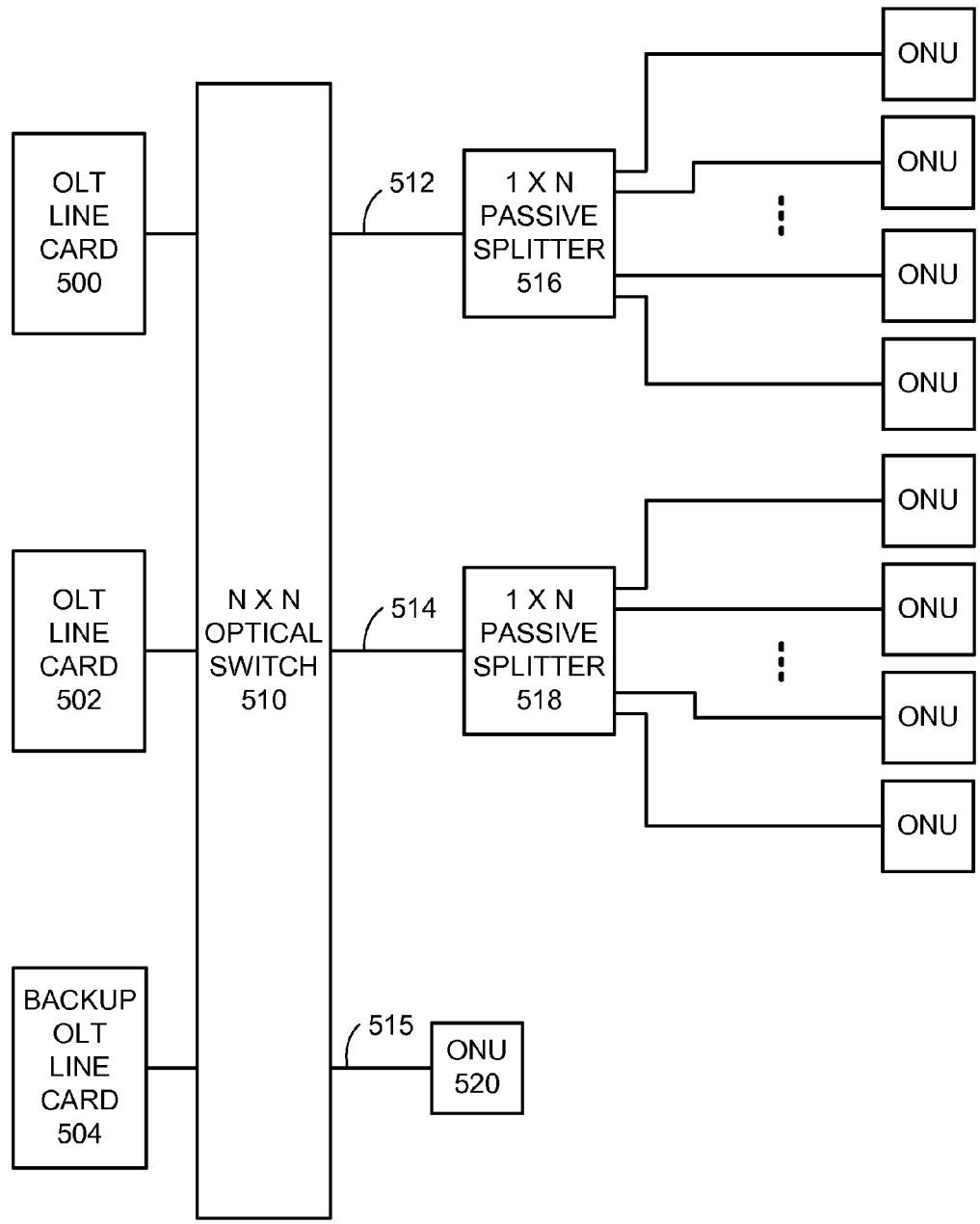
FIG. 5 illustrates a 1:N OLT line card protection scheme using an optical switch in accordance with an embodiment of the present invention.

FIG. 5 illustrates a 1:N line card protection scheme achieved by coupling OLT line cards 500, 502, and 504 with a N×N optical switch 510. A backup OLT line card 504 in this topology can protect either one of the working OLT line cards 500 and 502. An ONU 520 coupled to backup OLT line card 504 resides in the central office and is in a default configuration (i.e., it serves as a "dummy" ONU). The purpose of ONU 520 is to ensure that backup OLT line card 504 remains in an operational state. Periodic loop-back tests to ONU 520 can be performed to check the health of the components on backup OLT 504.

The topology shown in FIG. 5 provides both port and line card protection for working line cards 500 and 502. The fiber links between the central office and ONUs are not protected. However, one can achieve both 1:N line card protection and 1:1 fiber link protection by replacing N×N optical switch 510 with an N×2N optical switch, replacing 1×N passive splitters 516 and 518 with 2×N splitters, and adding a backup fiber trunk for each of fiber links 512 and 514 between optical switch 510 and passive optical splitters 516 and 518. Furthermore, backup OLT line card 504 can protect any one of working OLT line cards 500 and 502 in case of port and line card failure. This topology provides the best protection against link, port and line card failure.

Optical "Switch-Less" EPON Protection

The following EPON protection topologies do not require the use of an external optical switch, but involve modifications of the existing OLT line card or the ONU hardware based on the protection topology used. Overall per port protection cost with these topologies will be much lower compared to optical switch based on the topologies described above.

Figure 6:
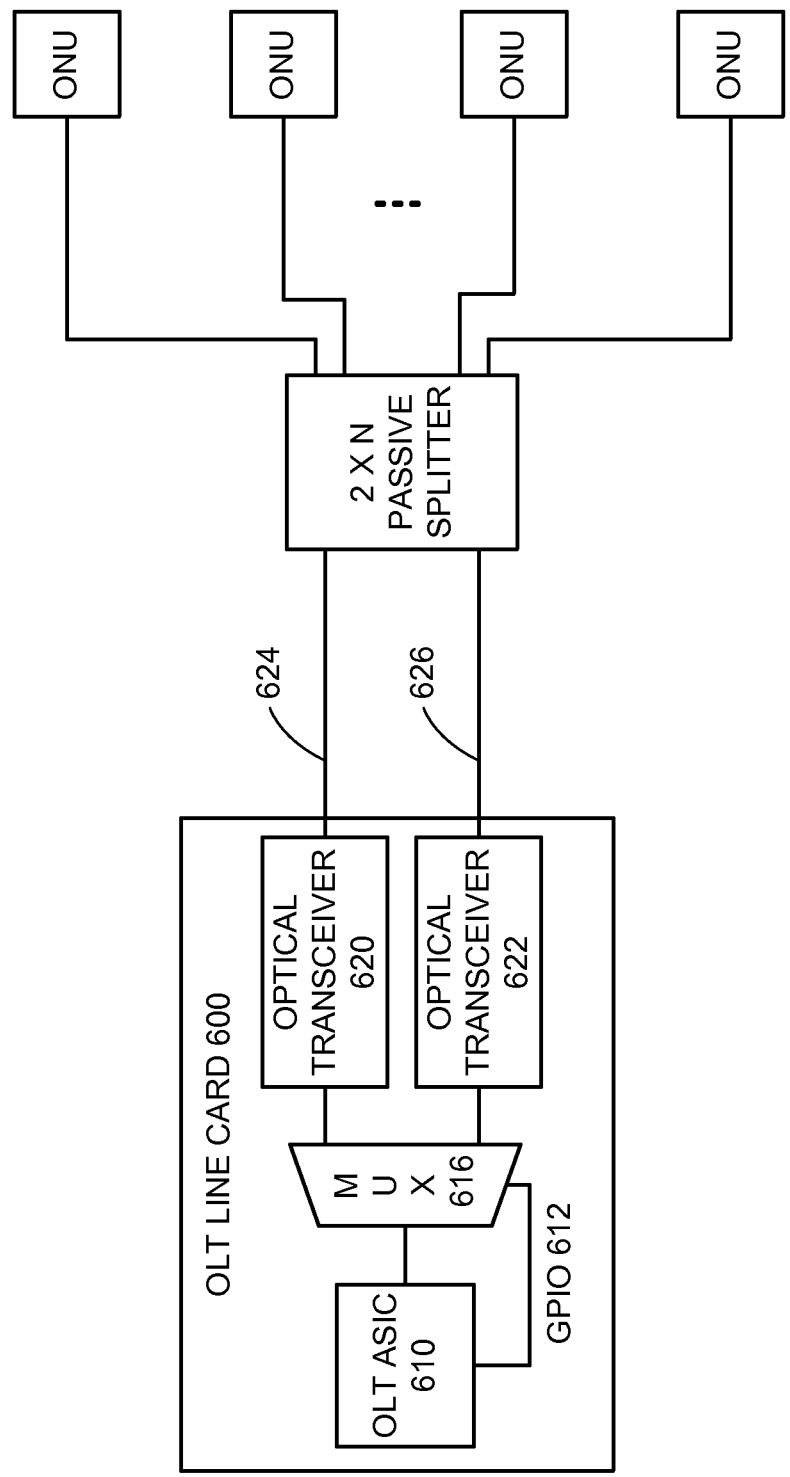
FIG. 6 illustrates an optical switch-less 1:1 fiber link protection scheme in accordance with an embodiment of the present invention.

FIG. 6 illustrates an optical "switch-less" protection topology with an OLT line card 600 modified to contain two optical transceivers 620 and 622 coupled through a multiplexer 616 to an OLT ASIC 610. Multiplexer 616 and the power to the transceivers 620 and 622 are controlled by a general-purpose input/output (GPIO) interface 612 from the OLT ASIC 610. If a working fiber link 624 or a working transceiver 620 goes down, the switchover can be made to a backup fiber link 626 and backup transceiver 622 by OLT ASIC 610 using GPIO 612. This configuration provides the fastest protection switching given that the entire configuration is retained in the OLT ASIC already and it does not require an external optical switch.

Figure 7:
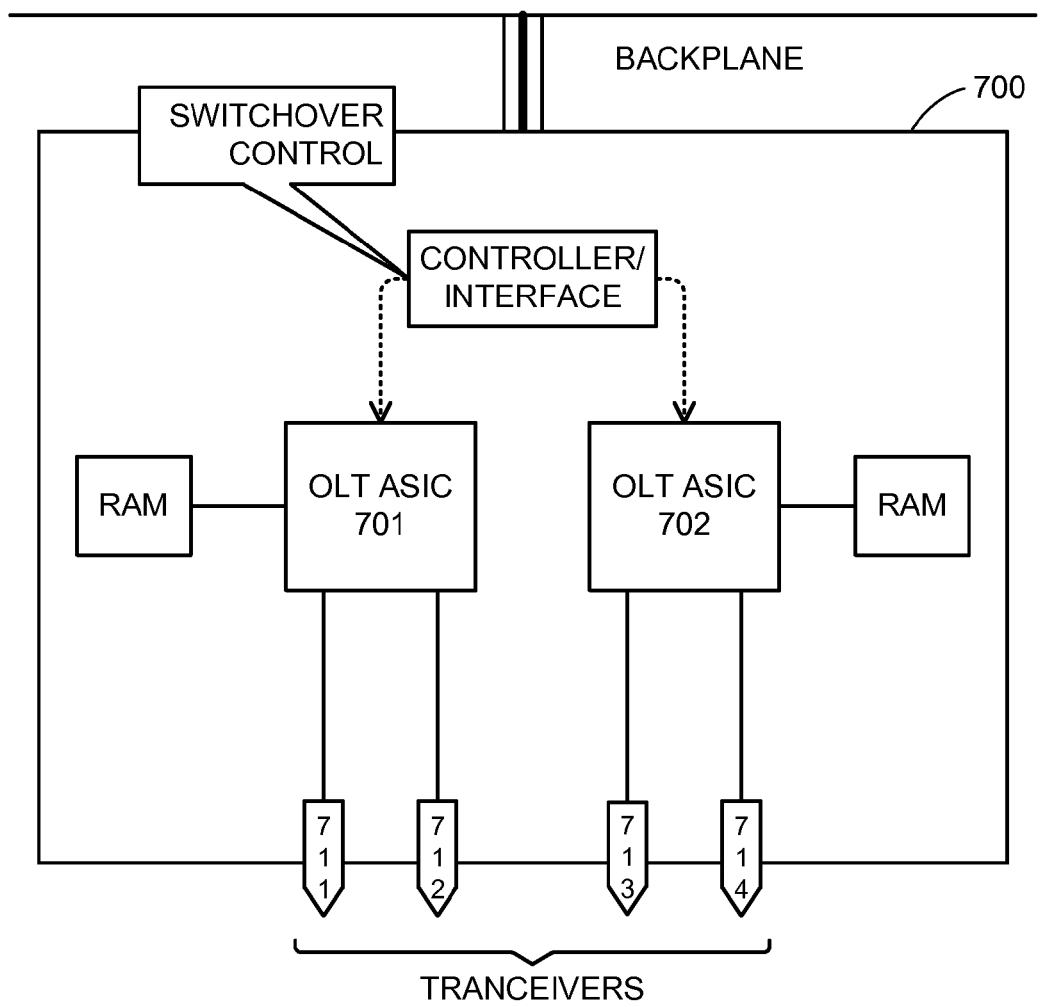
FIG. 7 illustrates an OLT configuration for 1:1 port and/or OLT chip protection without a multiplexer in accordance with an embodiment of the present invention.

The OLT line card architecture is sufficiently flexible that other "switch-less" protection configurations are possible. FIG. 7 illustrates a 1:1 port protection configuration without using a multiplexer. An OLT line card 700 contains two OLT ASIC chips 701 and 702, and each ASIC chip supports two ports. One can configure ports 711 and 712 as a working and backup port pair on OLT chip 701, and ports 713 and 714 as a working and backup port pair on OLT chip 702. Another possible configuration is to use OLT chip 701 as a working chip, and OLT chip 702 as a backup chip to achieve 1:1 OLT chip protection. In such a case, ports 711 and 712 are working ports protected by backup ports 713 and 714 on OLT line card 700.

Figure 8:
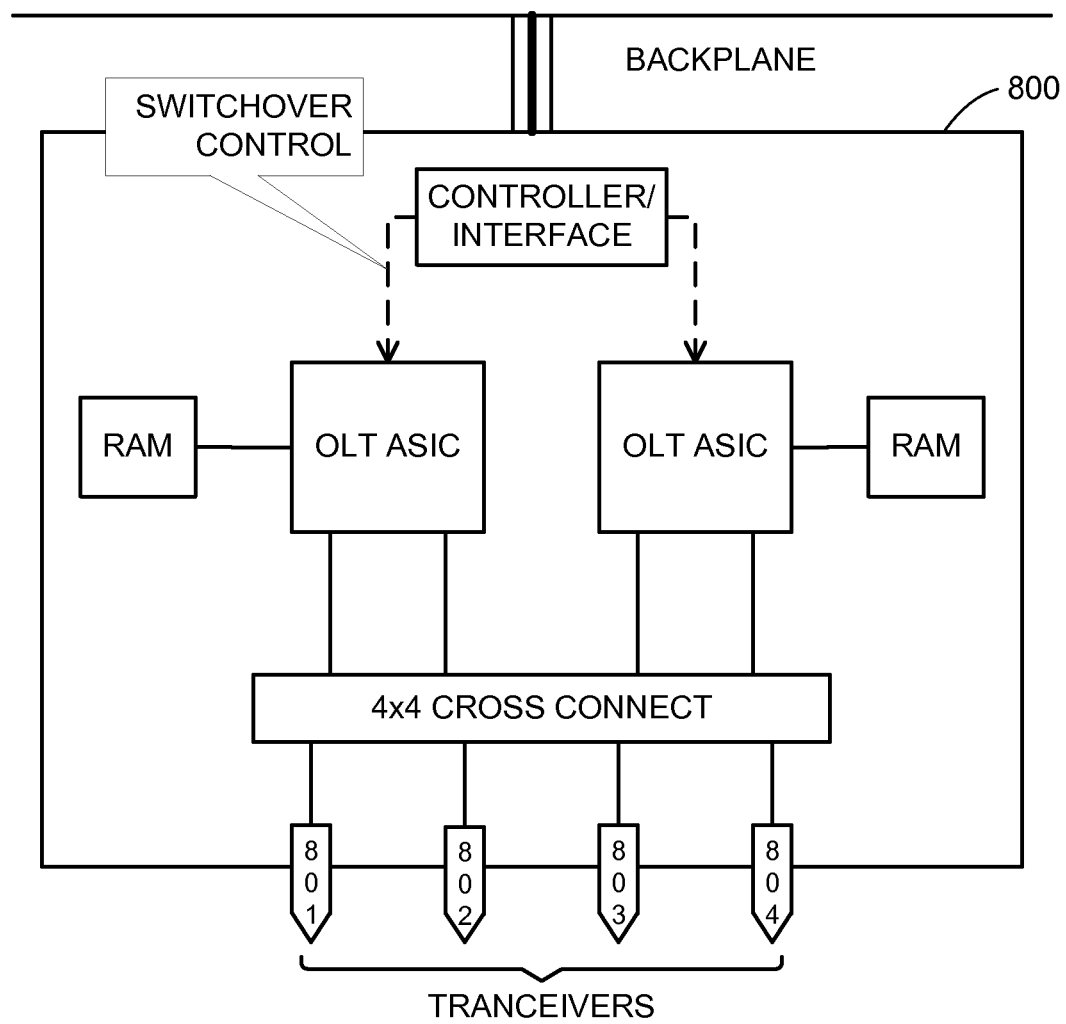
FIG. 8 illustrates an OLT configuration for 1:N port and/or OLT chip protection in accordance with an embodiment of the present invention.

FIG. 8 illustrates yet another configuration where a 4×4 cross connect is used to couple four transceivers 801, 802, 803, and 804. This cost-effective architecture implements 1:3 port-protection if one configures one of the transceivers as a backup. For example, transceivers 801, 802, and 803 are configured to be working ports protected by backup port 804. If any one of transceivers 801, 802, and 803 fails, the switchover can be made to backup port 804. Furthermore, by deploying two of the same OLT line cards 800 and using one of them as a backup, one can achieve four working ports with 1:1 line card protection.

Figure 9A:
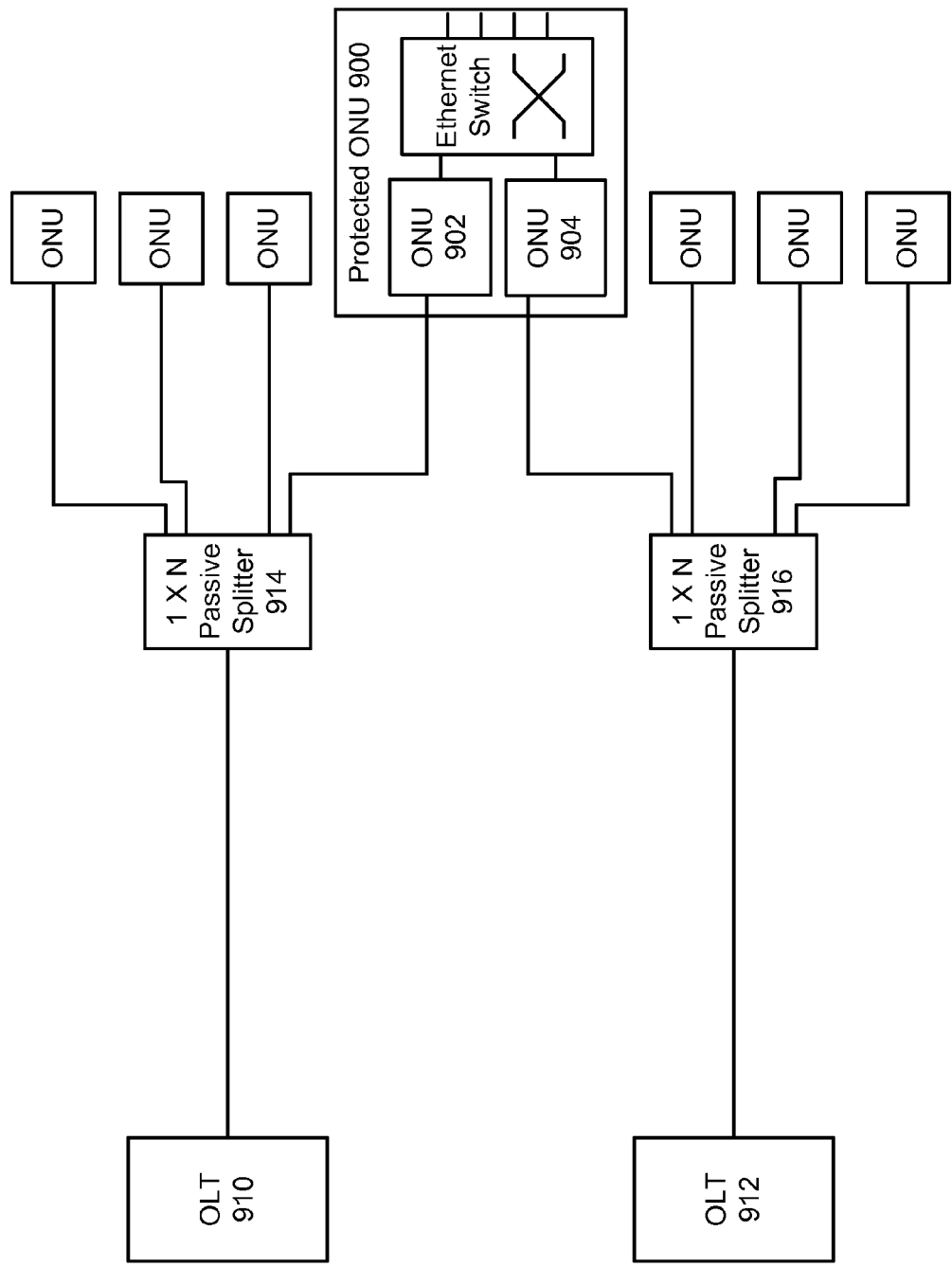
FIG. 9A illustrates an Ethernet switch based 1:1 full fiber path and ONU port protection topology with two ONU chips in accordance with an embodiment of the present invention.
Figure 9B:
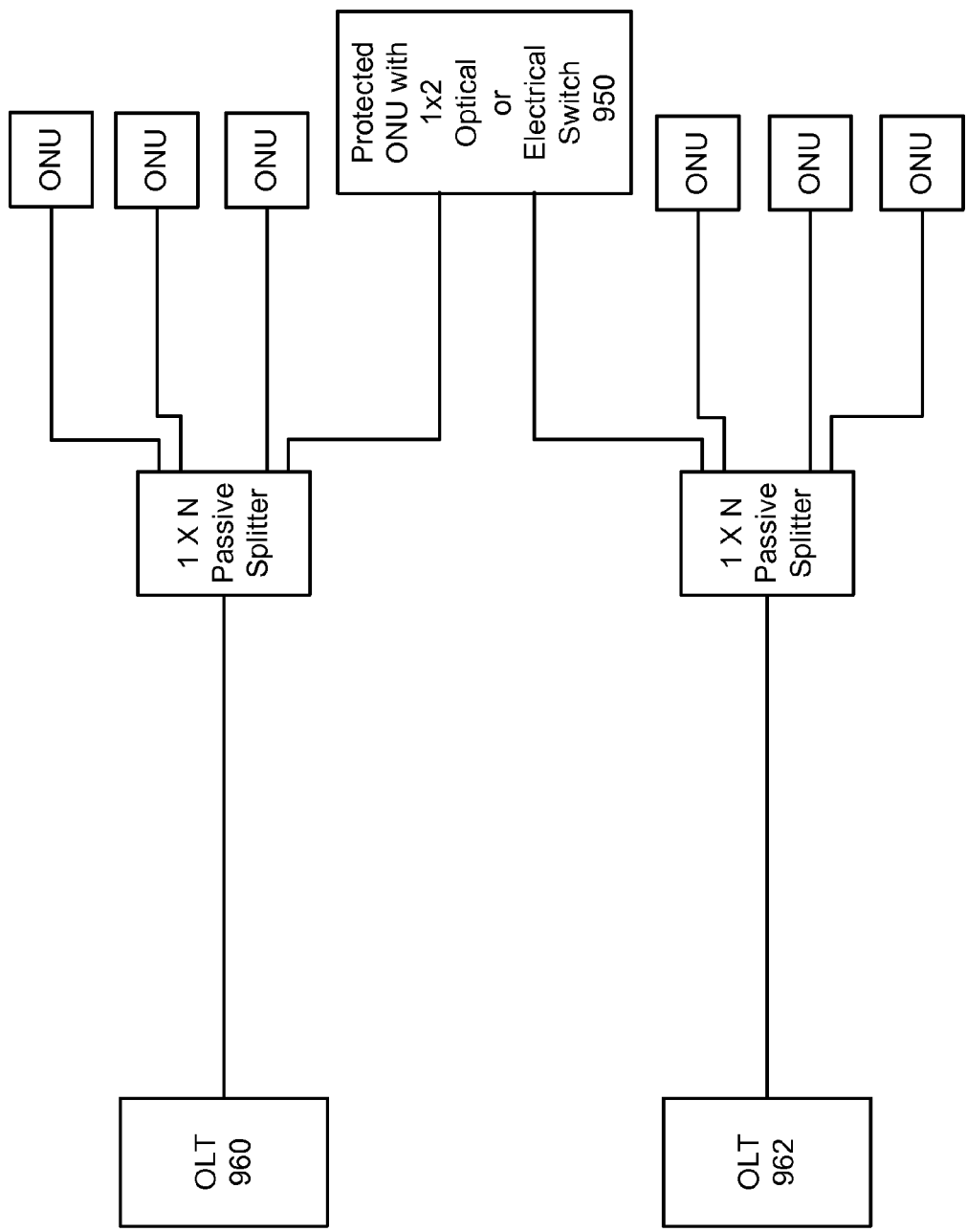
FIG. 9B illustrates a switch based 1:1 full fiber path and ONU port protection topology with in accordance with an embodiment of the present invention.

FIG. 9A and FIG. 9B illustrate the optical "switch-less" protection topology with modified ONUs. An ONU 900 in FIG. 9 contains two ONU ASIC chips 902 and 904. ONU chip 902 is coupled with OLT 910 through a 1×N passive splitter 914, and ONU chip 904 is coupled with OLT 912 through a 1×N passive splitter 916. Similarly, an ONU 950 in FIG. 9B has two fibers coupled through either an optical or an electrical switch to OLT 960 and OLT 962. In both cases, the protected ONUs couples to two different EPON networks through two different geographic paths. In such a topology, the ONU detects the loss of signal and switches from the working to the backup path. This topology can also provide 1+1 protection, wherein both paths carry data communication from and to OLTs. However, the bandwidth available during protection will be limited, and only critical services on the failed path can be switched over to the working path.

Figure 10:
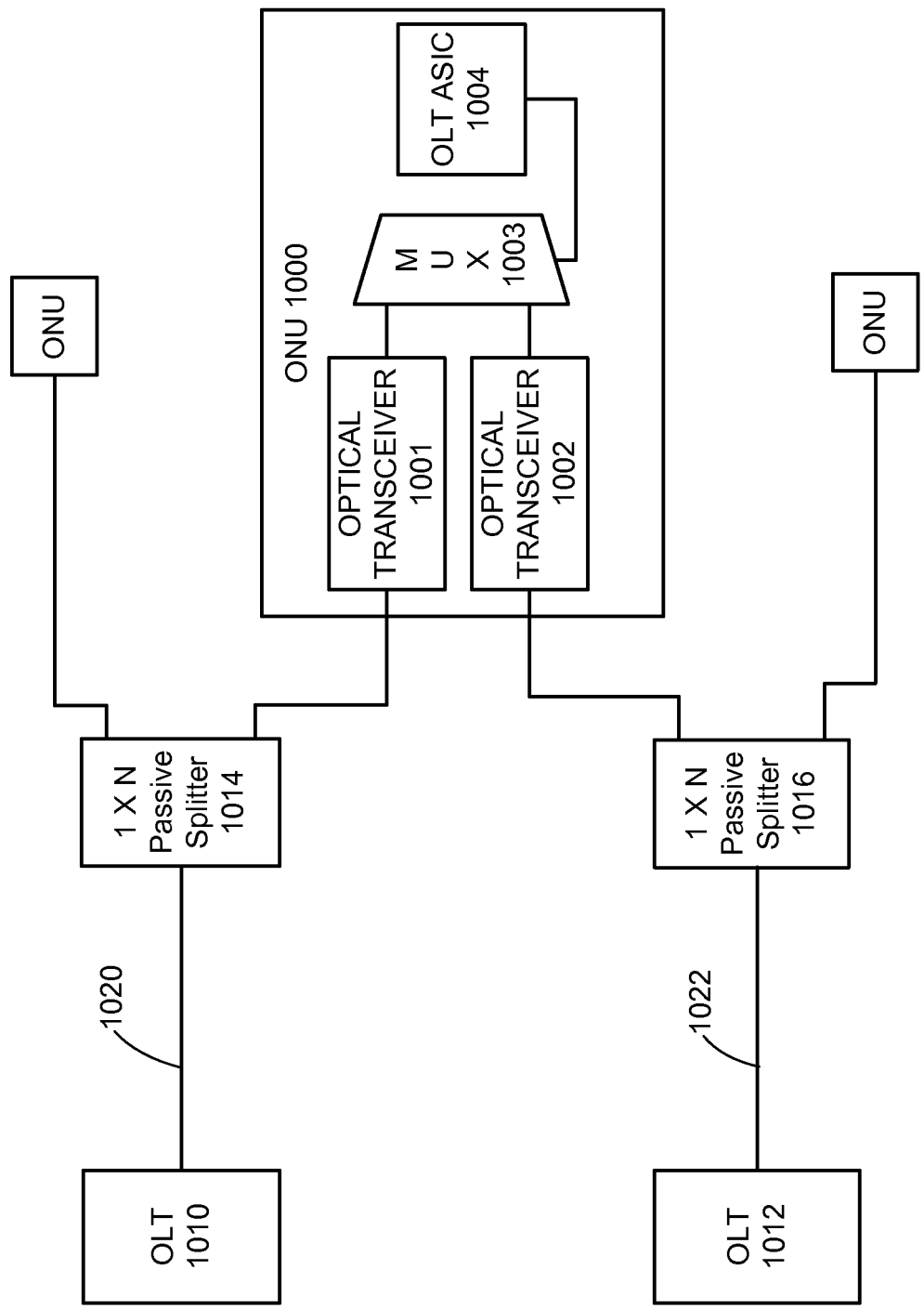
FIG. 10 illustrates a 1:1 full fiber path and ONU protection topology with dual optical transceivers in accordance with an embodiment of the present invention.

FIG. 10 illustrates a 1:1 full fiber path and ONU protection topology with dual optical transceivers in accordance with an embodiment of the present invention. An ONU 1000 contains two optical transceivers 1001 and 1002 coupled through a multiplexer 1003 to an ONU ASIC 1004. Transceiver 1001 is coupled with OLT 1010 through a 1×N passive splitter 1014, and transceiver 1002 is coupled with OLT 1012 through a 1×N passive splitter 1016. In one embodiment, an ONU with dual transceivers, such as ONU 1000 shown in FIG. 10, is configured with optical signal detect circuit coupled to the ONU ASIC through inter-integrated circuit (I2C) interfaces.

ONU 1000 can either power up the transceivers periodically to check the state of each path, or keep both transceivers powered to monitor optical power levels through the I2C interface. For example, when powering up for the first time, ONU 1000 checks the signal on a path 1020 and decides whether to register with an OLT 1010 based on the detected signal. Registration may be attempted if the signal is ON. Once registered, ONU 1000 then checks the signal state on another path 1022. If ON signal is detected, ONU 1000 switches to an OLT 1012 on a path 1022 forced by OAM. ONU 1000 then registers to OLT 1012 and uses OLT 1010 as the backup OLT. So far ONU 1000 has registered on both OLTs and is ready for protection switching. Whenever signal is OFF on backup path 1020, a re-registration to backup OLT 1010 can be scheduled in the next maintenance window to ensure backup path be ready for protection switching after the signal is restored. Alarms are triggered by ONU 1000 for any changes in the ON and OFF states of the optical signal to notify controller/host software of failures. This signal detection circuit provides a simple way to detect and notify failures on the backup path.

Figure 11:
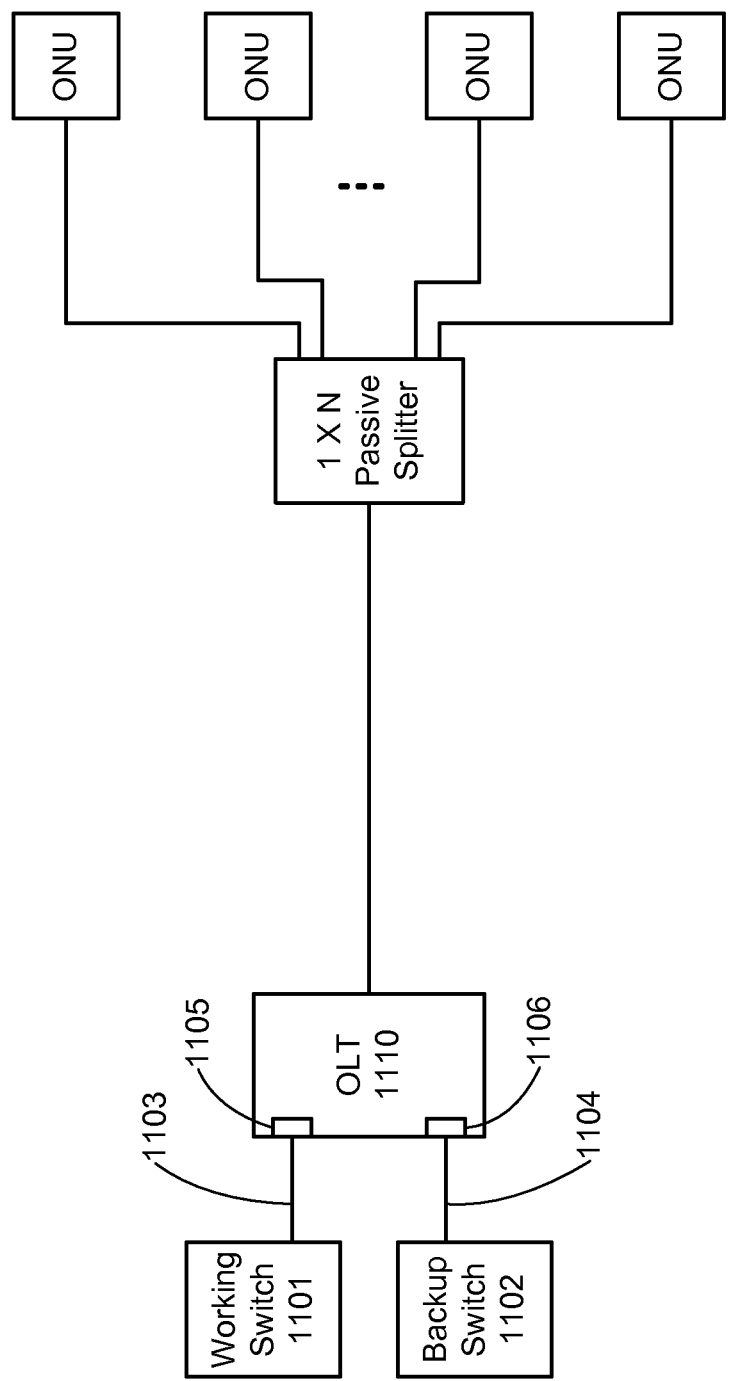
FIG. 11 illustrates a 1:1 OLT uplink protection topology in accordance with an embodiment of the present invention.

As illustrated in FIG. 11, a working uplink port 1105 of an OLT 1110 coupled to an upstream switch 1101 through an uplink 1103 is protected by a backup uplink port 1106 coupled to an upstream switch 1102 through an uplink 1104. This configuration provides 1:1 protection against failure of an upstream link 1103 and OLT uplink port 1105. All the traffic from failed port 1105 will be switched to backup port 1106. If 1+1 protection is preferred and both ports 1105 and 1106 are configured as working ports during normal operation, the total bandwidth available when one of them fails will be limited. In one embodiment, only the critical services on the failed port will be switched to the backup port.

Fast Protection-Switching Techniques

Protection against hardware failures at the edge of access network is vital to customer services. The goal of protection switching in EPON is to achieve the fastest possible recovery in cost-effective ways to reduce service disruption. EPON protection switching involves four major components—(a) failure detection, (b) switching to backup port, link, and/or line card base on the type of failure detected, (c) backup OLT configuration if required, and (d) service bring-up. The time it takes to perform these tasks is an important factor. In one embodiment, the controller/host software performs the failure-detection task. The optical switch and/or OLT/ONU can aid in detecting various failures. The failures include at least one of the following scenarios or a combination thereof: loss of upstream optical signal, loss of ONUs, loss of multiple links on the PON, degradation of network performance below a certain threshold, and excessive cyclic redundancy check (CRC), line code, or frame check sequence (FCS) errors.

In the optical-switch-based protection topologies described above, a controller/host controls the optical switch. Once a failure is detected, the optical port-switching commands are issued by the controller based on the type of failure detected. In the case of fiber cuts, the host can use the same OLT line card when switching to the backup fiber link. If the network is carefully planned and laid out, reconfiguration of the OLT line card can be avoided in this scenario which will result in faster restoration of services. In 1:1 line card failure protection, the controller/host software can pre-configure the backup OLT and save precious configuration time. In 1:N line card failure protection, the backup OLT is configured in real-time by the controller. It is important for the controller not to depend upon retrieving the existing configuration from the failed line card, which may not be accessible. The controller ideally retains provisioning information to send to the backup OLT card.

The provision of the backup OLT can be divided into five parts: common configuration among all the OLTs in the chassis, configuration of ONUs in the EPON, link-specific configuration required for the operation of the EPON protected, IP multicast (IPMC) group database, and other non-critical configuration. The majority of the carrier networks will have some common configuration among all OLTs in the chassis. Certain network parameters, global IPMC configuration, global bridging configuration, shared domains and so on fall under this category. The backup OLT can be configured up front for all these common parameters, so the precious time during protection switching can be utilized to configure critical link-related parameters.

Critical configuration related to ONU links has to be done during protection switching. This involves dedicated domains, paths, destinations and enabling of service level agreements (SLAs). A typical ONU can have three to four links Generally two to three of these links are associated with a prioritized bridging mode. One of the links is normally part of a shared domain. The shared domain can be configured as part of the common configuration in standby OLT. The destination for these shared domains requires configuration during the protection switching. For the dedicated prioritized domains, the domain, the destination, and the paths have to be configured at the time of protection switching.

If there are common paths for the destinations among various OLTs in the chassis, the host can pre-configure the queues and paths on the backup OLT up front as part of the common configuration to save recovery time during the protection switching. Default SLAs can also be used in the critical configuration phase to restore services first, and specific SLAs can be provisioned later in the non-critical configuration phase after the services are restored. Encryption is another non-critical configuration that can be restored after services are up. From deployment to deployment, the category of any particular configuration item may vary.

OLT Standby and ONU Holdover

The multipoint control protocol (MPCP) provides auto-discovery, registration, bandwidth polling, and ranging in EPON. When an EPON is first powered up, or when new ONUs join the PON, the ONUs notify the OLT of their existence and capabilities. The OLT then assigns unique logical link IDs (LLIDs) and bandwidth to ONUs, and coordinates the communication among ONUs over the shared optical medium. Furthermore, a discovery process of operations, administration, and maintenance (OAM) provides mechanisms to monitor link status between OLT and ONUs.

During the protection-switching process, since the OLT and ONUs are already aware of the majority of the parameters discovered during initial MPCP registration and OAM discovery, the MPCP registration and OAM discovery can be skipped, as long as the holdover timer is not expired. An ONU holdover mode is therefore enabled to retain the current state of the ONUs for fast protection switching. ONUs in the holdover mode only need to re-acquire Clock and Data recovery (CDR) and MPCP sync once the switching is performed to the backup link. The OLT needs to adjust range values for each ONU, since the backup link implies different fiber length. One embodiment of the present invention also provides directed service registration and IPMC group protection techniques to ensure fast service recovery, which will be described in the following sections. The ONU holdover mode can eliminate the discovery process and reduce the protection-switching time significantly.

Ideally, ONUs in the EPON retain majority of the configuration state information when they switch to the holdover mode. This may require ONUs to defer the normal processing upon observing laser loss or link deregistration, and wait for the backup OLT to become active. The holdover mode not only saves the time to reconfigure all the ONUs, but also ensures directed service registration and multicast group protection. The backup OLT has a different source MAC address from the failed OLT. Normally, a change of this MAC address indicates repeating various ONU rediscovery including report mode and FEC. In one embodiment, the holdover mode can disable this process and keep the same setting for the backup OLT. Retained ONU attributes include previously assigned LLID, discovered OAM capabilities such as max frame length and supported OAM extensions, and report mode and FEC setting.

Figure 12A:
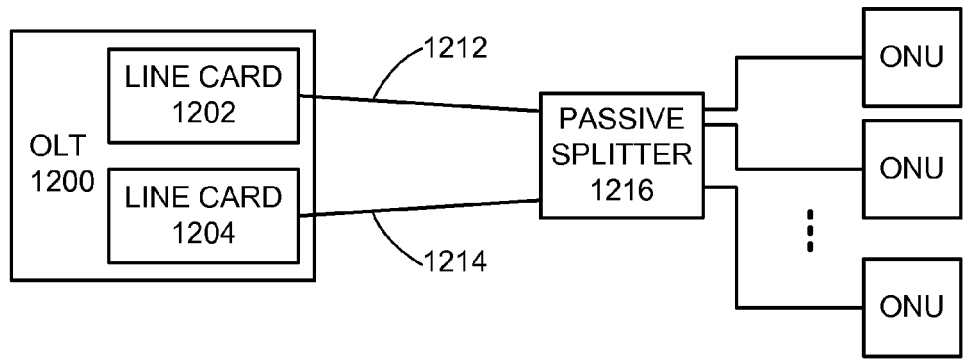
FIG. 12A illustrates a 1:1 OLT line card protection scheme in accordance with an embodiment of the present invention.

FIG. 12A illustrates a 1:1 OLT line card protection scheme in accordance with an embodiment of the present invention. An OLT 1200 is configured with two line cards 1202 and 1204 coupled to a passive splitter 1216 through trunk fibers 1212 and 1214, respectively. Line card 1202 is configured as the working line card and 1204 as the standby line card. When the PON is powered up, a first ONU registers to both line cards so that the round-trip time on both trunk fibers is determined. Subsequent ONUs are registered to working line card 1202 only, however, the registration information is copied to backup line card 1204 for fast protection switching purpose. The backup line card is said to maintain a static registration. Since there is no upstream traffic passing through backup line card 1204, in conventional operation, the backup line card could deregister all the ONUs due to the lack of proper MPCP or OAM communication. To avoid this deregistration, a new standby mode is added. In this standby mode, backup OLT line cards retain all the ONU registration information and LLIDs without deregistration. When line card 1202 or trunk fiber 1212 fails, OLT 1200 switches to backup line card 1204 and trunk fiber 1214 with correct registration information, and ONUs in holdover to ensure fastest protection switching.

Figure 12B:
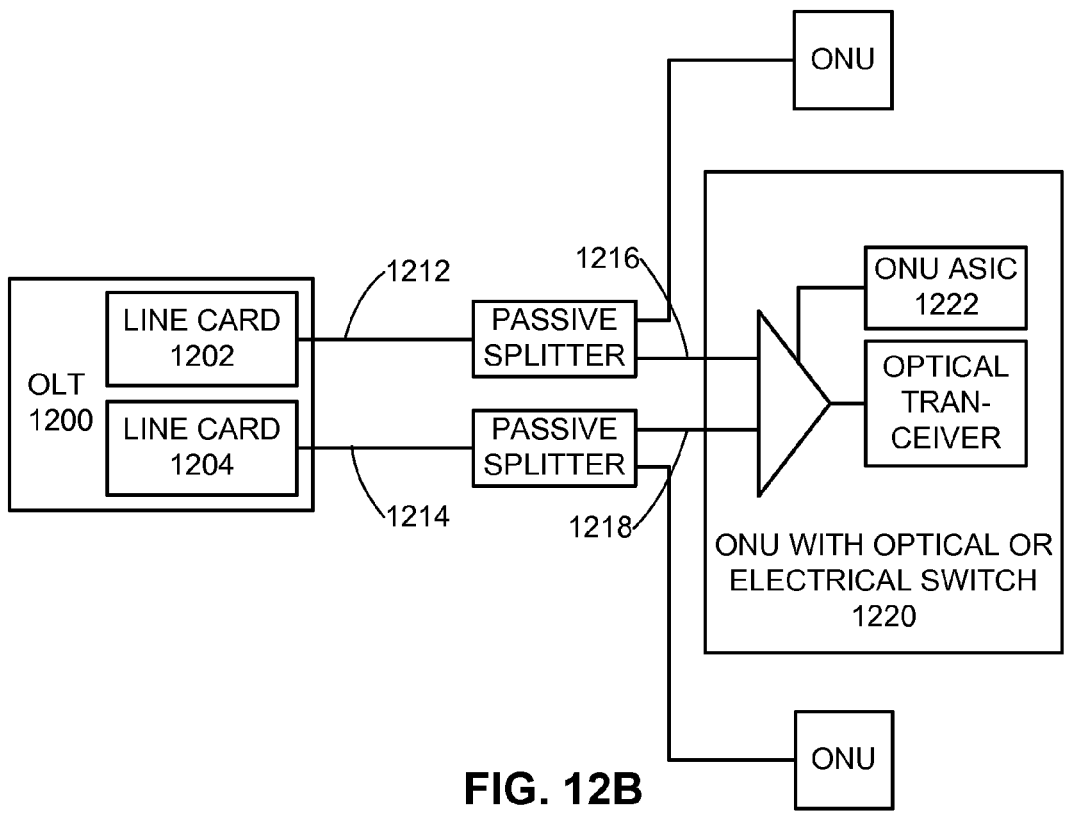
FIG. 12B illustrates a 1:1 full fiber path protection scheme in accordance with an embodiment of the present invention.

FIG. 12B illustrates a full path protection scheme in accordance with an embodiment of the present invention. Two independent paths between OLT 1200 and ONU 1220 exist. For example, ONU 1220 may choose a first path through a trunk fiber 1212 and a branch fiber 1216 as the working path, and a second path through a trunk fiber 1214 and a branch fiber 1218 as the backup path. Similar to FIG. 12A, OLT 1200 is configured with two line cards 1202 and 1204, where backup line cards 1204 is in standby mode and maintains a static registration of ONU 1220. ONU chip 1222 switches to the backup path when trunk fiber 1212 or branch fiber 1216 gets cut. This configuration provides a flexible protection switching given that the entire configuration is retained in both OLT 1200 and ONU 1220 and the switchover is initiated by the ONU.

Both protection schemes shown in FIGS. 12A and 12B are applicable to the 1:N protection case. The only difference is that the standby OLT line card does not keep a static registration. When protection switching happens, the registration information needs to be copied over from the protected working OLT to the standby OLT. Note OLT standby and ONU holdover are not limited to protection schemes shown in FIGS. 12A and 12B. They apply to any other network topologies.

OLT Ranging Adjustment

In the upstream direction from ONUs to the OLT, PON is a passive multipoint-to-point network. Because the distance from each ONU to the OLT is different, propagation delay for each ONU differs. If every ONU transmits at will, data frames may collide at the point where fibers from different ONUs join together. This procedure to synchronize ONUs for sending data upstream to avoid frame collisions is called ranging. Ranging should be performed before an ONU is allowed to transmit data upstream.

After the ONU is powered on, the OLT initiates the ranging procedure. The OLT starts by allocating an initialization grant slot during which all operational ONUs suspend their transmission. The OLT then broadcasts a discovery GATE message to all ONUs with a timestamp of its local time. As soon as the GATE message is received, an unregistered ONU sets its local time to the timestamp in the GATE message and responds to the OLT with a REGISTER_REQ message. The REGISTER_REQ message contains a timestamp marking the ONU's local time when the message is sent. OLT can calculate the round-trip propagation delay based on the timestamp in the discovery GATE message it sent and the timestamp in the REGISTER_REQ message it received.

In the 1:1 fiber link protection schemes illustrated in FIG. 2 and FIG. 4, the working trunk fiber and the backup trunk fiber typically take diverse paths for protection purposes. Hence, the working trunk fiber and the backup trunk fiber often have different lengths, and ONUs can experience different ranges when switching over to the backup link from the working link. Note that existing ONUs function well even without ranging adjustment after the protection switching occurs, because each ONU's range is shifted the same amount of time. The OLT can be configured to ignore such range adjustment during protection switching, and apply the adjustment gradually after the protection switching is done. However, if new ONUs join the PON before the range adjustment, this method may cause the PON to be inoperative.

In one embodiment, one can balance the lengths of these two fibers by extending the short fiber to match the long fiber, so that ranging remains unchanged. Otherwise, re-ranging or ranging adjustment can be performed. Since only the fiber trunk is switched, all the ONU range values can be adjusted by the same amount. This offset can be calculated up front and provisioned prior to protection switching. One embodiment of the present invention calculates the difference of the propagation delay between the backup trunk and the working trunk, and applies an offset to the existing ranging for all the ONUs. The range offset can be decided during initial ranging performed on both the working and backup trunks. The offset may also be determined in real-time during a failure protection, or beforehand when testing protection switching in a scheduled maintenance window. In either case, ranging can be performed for all ONUs in the EPON, or more preferably, range offset measured from a single ONU can be applied to all other ONUs in the EPON for fast protection switching.

In another embodiment, ranging can be performed on both working and backup OLTs at the same time. The round-trip delay at both OLTs can be measured simultaneously given a common reference time point. For example, in FIG. 12A, line card 1202 is in working mode with line card 1204 in standby mode. Assuming that a highly precise one-pulse-per-second (1PPS) signal is present on both line cards. The synchronized 1PPS signal is used to trigger ranging at the same time. In order for the simultaneous ranging scheme to work, the transmission laser is turned off on the backup OLT, whereas the receiver remains operational. The ranging process is performed on both OLTs and the REGISTER_REQ message from unregistered ONUs are received on both.

Figure 12C:
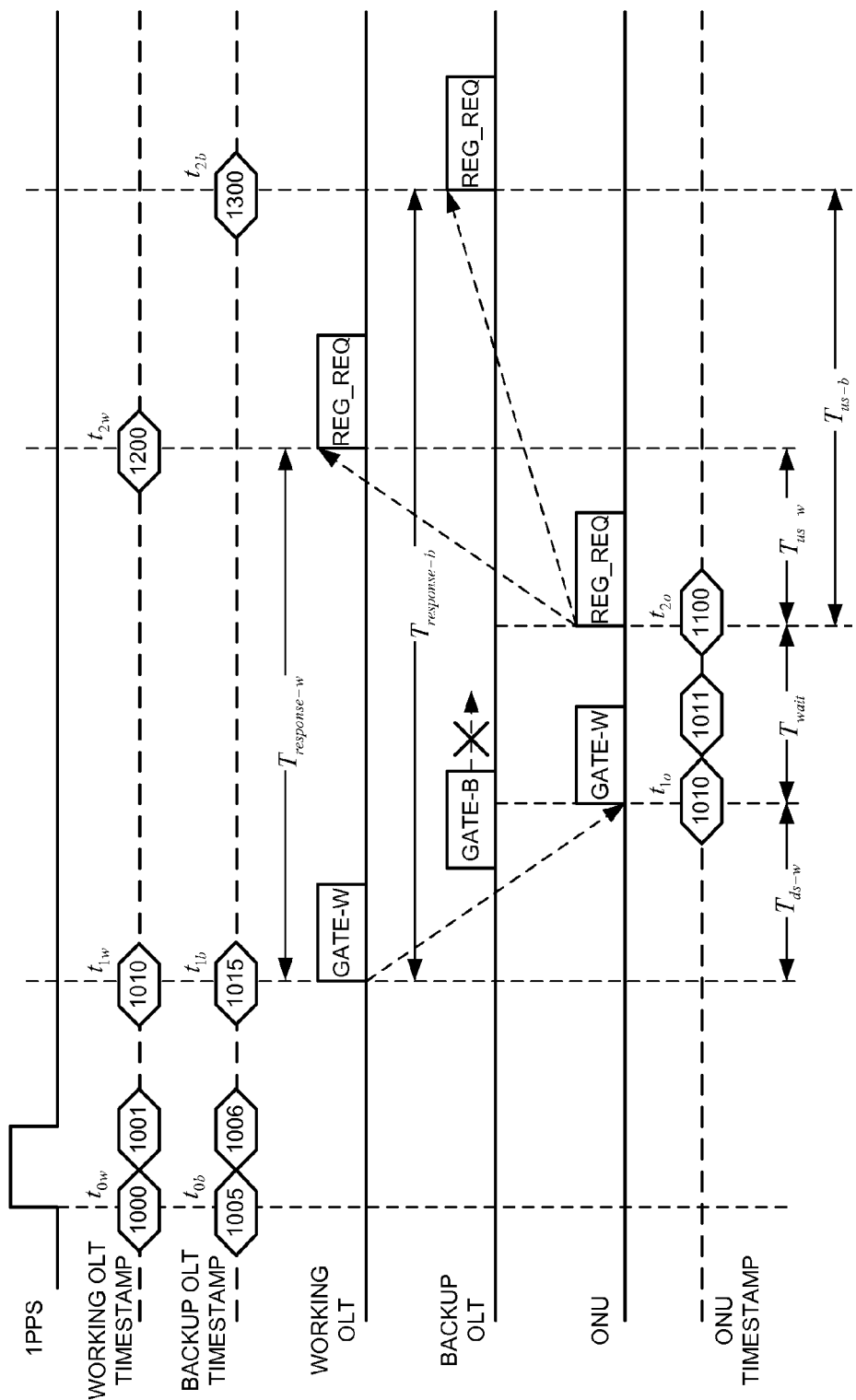
FIG. 12C presents an exemplary timing diagram of simultaneous ranging at both the working and standby OLTs in accordance with an embodiment of the present invention.

FIG. 12C presents an exemplary timing diagram of simultaneous ranging at both the working and standby OLTs. First, a 1PPS signal triggers the ranging process at both the working OLT and backup OLT. Assume that the local time at the working OLT when the 1PPS signal is received $t_{0w}$=1000, while at the backup OLT $t_{0b}$=1005. The working OLT broadcasts a discovery GATE messages, labeled GATE-W in FIG. 12C, at time $t_{1w}$=1010. The backup OLT also attempts the broadcasting but the GATE-B message is not transmitted, because the transmission laser is turned off on the backup OLT. The GATE-W arrives at an unregistered ONU and the ONU sets its local time $t_{1o}$=1010, the same timestamp carried in the message. Next, the ONU responds with a REGISTER_REQ message at its local time $t_{2o}$=1100 and the message is labeled REG_REQ in FIG. 12C. The REG_REQ message is received by the working OLT at its local time $t_{2w}$=1200 and by backup OLT at its local time $t_{2b}$=1300.

The round-trip time (RTT) at the working OLT can be calculated based on measured response time interval $T_{response-w}$. This time interval includes three parts: the downstream propagation delay $T_{ds-w}$, the waiting period $T_{wait}$ between the times when the ONU receives the GATE-W message and when it sends the REG_REQ messages, and the upstream propagation delay $T_{us-w}$. Hence, the round-trip time is the difference between the measured response time interval and the waiting time:

$$\begin{aligned} RTT_w &= T_{ds-w} + T_{us-w} \\ &= 2 \cdot T_{ds-w} \\ &= 2 \cdot T_{us-w} \\ &= T_{response-w} - T_{wait} \\ &= (t_{2w} - t_{1w}) - (t_{2o} - t_{1o}) \\ &= (1200 - 1010) - (1100 - 1010) \\ &= 100. \end{aligned}$$

Similarly, the measured response time interval $T_{response-b}$ includes three parts as well: the downstream propagation delay $T_{ds-w}$ (because the GATE-W message is sent by the working OLT to the ONU), the waiting period $T_{wait}$ between the time when the ONU receives the GATE-W message and when it sends the REG_REQ messages, and the upstream propagation delay $T_{us-b}$ which is the time the REG_REQ message takes to travel from the ONU to the backup OLT. Hence, the round-trip time at the backup OLT is calculated as follows:

$$\begin{aligned} RTT_b &= 2 \cdot T_{us-b} \\ &= 2 \cdot (T_{response-b} - T_{ds-w} - T_{wait}) \\ &= 2 \cdot \left[ (t_{2b} - t_{1b}) - \frac{1}{2} RTT_w - (t_{2o} - t_{1o}) \right] \\ &= 2 \cdot [(1300 - 1015) - 100/2 - (1100 - 1010)] \\ &= 290 \end{aligned}$$

In order to determine the local time $t_{1b}$ at the backup OLT when the working OLT broadcasts the GATE-W message, we apply the time difference between the local time $t_{0w}$ and $t_{0b}$ when 1PPS signal is triggered to the working OLT's local time $t_{1w}$: $t_{1b}=t_{1w}+(t_{0b}-t_{0w})=1010+(1005-1000)=1015$.

Directed Service Discovery

The impact of disruption time varies with the type of service. A complete protection switching ideally accomplished within 50 ms would reduce human-perceived effects of loss of service to the minimum level. Disruption time greater than one second can result in voice-over-IP (VoIP) calls being dropped, thus requiring redialing. Similarly, disruption time greater than the maximum time most video player software can cache may result in video service interruption. Various data sessions also have timeout values which may cause those sessions to be restarted.

The order in which the links are brought up is, therefore, important in service restoration. VoIP links can be brought up first, followed by multicast video and unicast video, and lastly data links. One embodiment of the present invention allows so-called directed registration to eliminate the random back-off element of the broadcast discovery. The backup OLT is given a list of logical links known to be on the network that has been discovered by the failed OLT. For each logical link, the backup OLT re-acquires the MAC address, assigned LLIDs, and ONU range. Each logical link on the list receives a discovery GATE message addressed to the unicast MAC address with a window sufficient for the MPCP REGISTER_REQUEST message, which reduces the extra discovery window size necessary to accommodate multiple responses with no chance of collision because the discovery message will be ignored by all other ONUs except the one whose MAC address was contained in the directed discovery GATE message. Directed registration follows the prioritized order provided by the controller/host software for service link registration, in contrast to normal discovery process where prioritization is not guaranteed.

IPMC Group Protection

Special care is needed for restoring the high priority video broadcast in 1:1 or 1:N OLT line card protection switching. An OLT maintains an IP multicast (IPMC) group database for all the downstream subscriptions. The backup OLT cannot depend upon the failed OLT for retrieval of the database. It is possible for the backup OLT to request the IPMC information from its upstream switch which generally maintains a group-subscription database. Another solution relies on a central server which constantly monitors the joins and leaves of all the multicast groups, and updates a global IPMC database. This database can be transferred to the standby OLT as default groups to receive the restored video broadcast services.

The backup OLT would normally block all IPMC traffic downstream until the IPMC database is recovered. To further reduce service disruption, in accordance with one embodiment of the present invention, the backup OLT maintains an IPMC proxy, which allows all downstream IPMC traffic to flow without any restriction at the beginning of the protection switching in order to prevent service disruption. After rediscovering the initial IPMC group database, the OLT IPMC proxy will return to normal operation to block multicast traffic except those groups joined by ONUs. This scheme works flawlessly in the EPON because ONUs with state holdover will have their local IPMC group databases intact, and the upstream switch is generally multicast-aware so as not to forward non-subscribed multicast traffic to the backup OLT. Therefore, allowing all multicast traffic to pass briefly will not change the actual traffic present on the EPON.

An OLT IPMC proxy can also build a group database by sending general queries to Set Top Boxes (STB) at subscriber end to discover the group currently subscribed without querying the upstream switch or the central multicast server.

Figure 13:
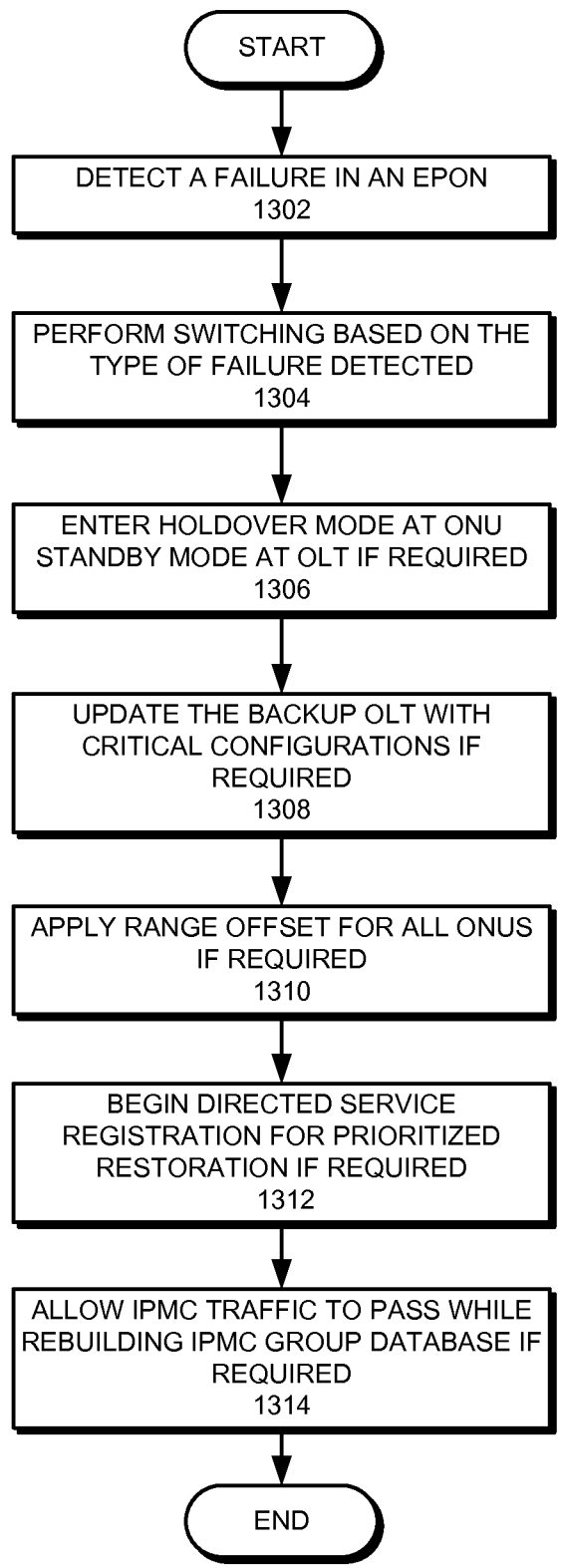
FIG. 13 presents a flow chart illustrating the process for OLT fast protection switching in accordance with an embodiment of the present invention.

FIG. 13 presents a flow chart illustrating an exemplary procedure of OLT fast protection switching in accordance with embodiments of the present invention. During operation, the system first detects a failure in an EPON (operation 1302). The system then performs switching to the backup optical port, link, and/or line card base on the type of failure detected (operation 1304). Next, the OLT enters the standby mode and ONUs enter holdover mode during protection switching if required (operation 1306). The system updates the backup OLT with critical configurations if required (operation 1308). The OLT then applies range offset for all ONUs if required (operation 1310), and starts directed registration to restore service in a prioritized order if required (operation 1312). The OLT subsequently allows all IPMC traffic to pass while rebuilding IPMC group database to further reduce service disruption if required (operation 1314).

Figure 14:
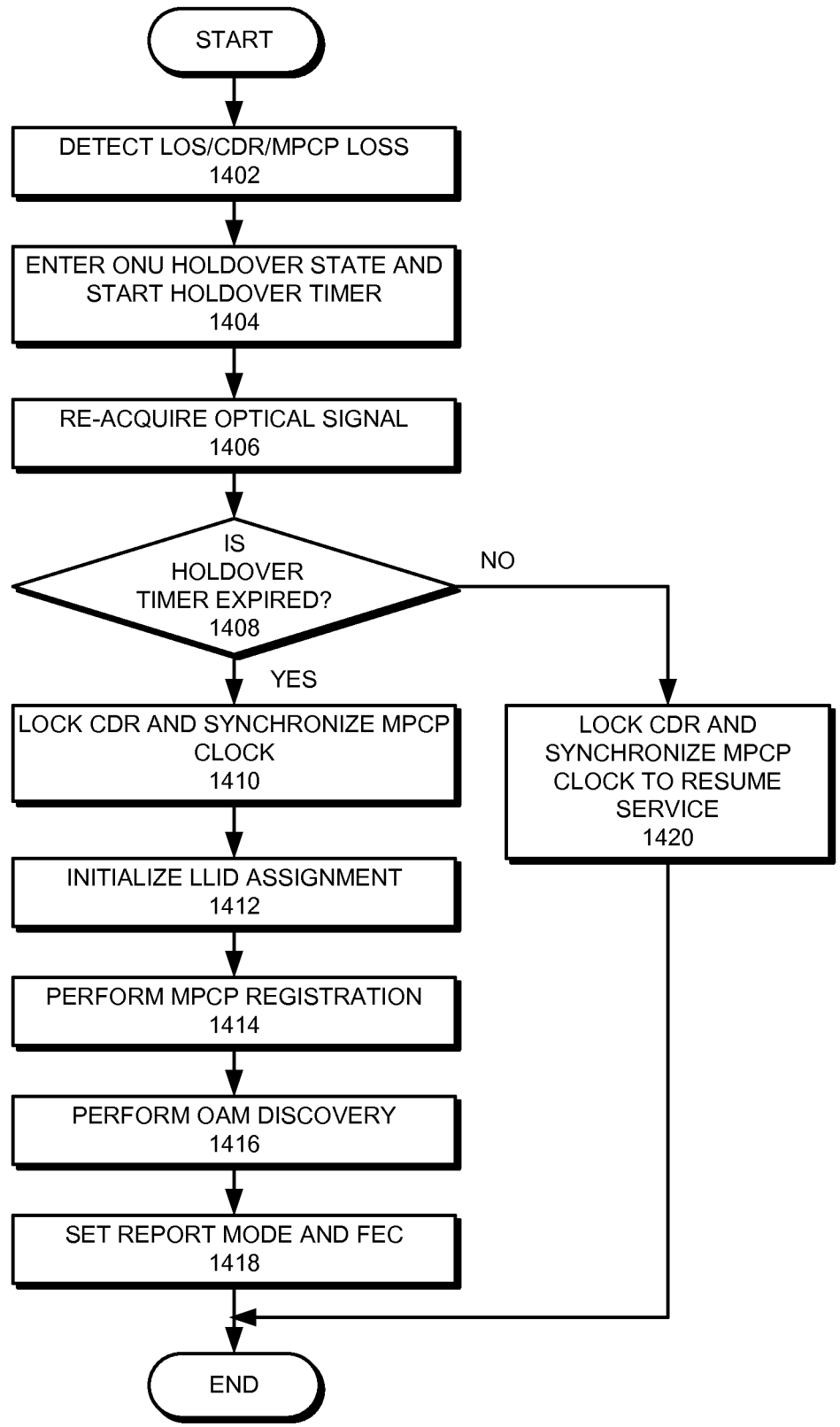
FIG. 14 presents a flow chart illustrating the process for ONU fast protection switching in accordance with an embodiment of the present invention.

FIG. 14 presents a flow chart illustrating an exemplary procedure of ONU fast protection switching in accordance with embodiments of the present invention. During operation, the ONU first detects a loss of signal (LoS), or loss of CDR or MPCP sync (operation 1402). The ONU then enters a holdover state and starts the holdover timer (operation 1404). Next, the ONU attempts to reacquire optical signal after the failure (operation 1406). The ONU then determines whether the holdover timer is expired (operation 1408). If so, the ONU resets and conducts complete network discovery. During the network discovery, the ONU first locks CDR and synchronizes MPCP clock (operation 1410). Next, the ONU initializes LLID assignment (operation 1412). The ONU then performs MPCP registration (operation 1414), and OAM discovery (operation 1416). The ONU subsequently sets report mode and FEC (operation 1418) to begin operation. If the holdover timer is not expired, the ONU locks CDR and synchronize MPCP clock to resume service (operation 1420), thereby, retains working attributes for fast protection switching.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for performing protection switching in an Ethernet passive optical network (EPON), comprising:
    detecting a failure of a working line card at an optical line terminal (OLT); and
    switching to a redundant line card at the OLT to reduce service disruption time in response to detecting the failure, wherein preparation for the switching or the switching itself includes:
        preserving existing registration information of optical network units (ONUs), registered with the working line card, at the redundant line card,
        determining the redundant line card to use for protection switching based on a type of the failure, and
        configuring the redundant line card to maintain the preserved existing registration information as static registration information to prevent the redundant line card from deregistering the ONUs.

2. The method of claim 1, further comprising configuring a second redundant line card by performing at least one of the following configurations:
    configuring two transceivers coupled to an OLT end of an optical fiber for link protection;
    configuring two ports for port protection, wherein the working and protected ports may reside on a single OLT chip, or on a single OLT line card but different OLT chips, or on different OLT line cards;
    configuring a backup port and one or more working ports for port protection, wherein the backup port can protect any of the working ports; and
    switching upstream traffic to a protected uplink port for uplink port protection.

3. The method of claim 1, further comprising configuring a second redundant line card by performing at least one of the following configurations:
    configuring two transceivers coupled to an ONU end of an optical fiber for link protection;
    configuring two ports for port protection, wherein the working and backup ports reside on a single ONU, or on different ONUs coupled by a switch; and
    configuring a 1-by-2 optical switch with one port coupled to the single ONU or different ONUs and the other two ports coupled to working and backup fibers, respectively.

4. The method of claim 3, wherein the working and backup ports reside on the single ONU, and wherein the method further comprises duplicating ONU traffic on both the working and backup ports.

5. The method of claim 3, wherein the working and backup ports reside on the single ONU, and wherein the method further comprises:
    detecting failure on the working port and switching to the backup port; and
    monitoring optical signals on the backup port to report backup path failure to the single ONU.

6. The method of claim 3, further comprising configuring both the working and backup ports to be in an operating mode, and sharing normal traffic load between the working, and backup ports.

7. The method of claim 1, further comprising:
    maintaining a holdover timer at one of the ONUs;
    entering a holdover mode at the one of the ONUs if the holdover timer is not expired; and
    recovering from failure at the one of the ONUs in the holdover mode without performing ranging, registration, or discovery.

8. The method of claim 1, further comprising provisioning the EPON with balanced trunk paths between the OLT and the ONUs to avoid range adjustment in protection switching.

9. The method of claim 1, further comprising performing critical link configuration by applying a range offset for protected path and direct registration with prioritized service discovery.

10. The method of claim 1, further comprising maintaining an OLT Internet protocol multicast (IPMC) proxy which is configured to:
    allow downstream IPMC traffic to flow without any restriction when switching occurs; and
    build a multicast group database by sending startup queries to discover multicast groups currently used by subscribers.

11. The method of claim 1, wherein the switching further comprises switching to the redundant line card at the OLT on demand in response to a protection-switching command.

12. The method of claim 1, wherein the switching further comprises automatically switching to the redundant line card.

13. A system configured to perform protection switching in an Ethernet passive optical network (EPON), comprising:
    a failure detection mechanism configured to detect a failure of a working line card at an optical line terminal (OLT); and
    a switching mechanism configured to switch to a redundant line card at the OLT to reduce service disruption time in response to the failure detection mechanism detecting the failure, wherein preparation for the switching or the switching itself includes:

determining the redundant line card to use for protection switching based on a type of the failure, and preserving existing registration information of optical network units (ONUs), registered with the working line card, at the redundant line card; and a configuration mechanism configured to configure the redundant line card to maintain the preserved existing registration information as static registration information to prevent the redundant line card from deregistering the ONUs.

14. The system of claim 13, a where the configuration mechanism is further configured to perform at least one of the following operations:

configuring two transceivers coupled to an OLT end of an optical fiber for link protection;

configuring two ports for port protection, wherein the working and protected ports may reside on a single OLT chip, or on a single OLT line card but different OLT chips, or on different OLT line cards;

configuring a backup port and one or more working ports for port protection, wherein the backup port can protect any of the working ports; and switching upstream traffic to a protected uplink port for uplink port protection.

15. The system of claim 13, where the configuration mechanism is further configured to perform at least one of the following operations:

configuring two transceivers coupled to an ONU end of an optical fiber for link protection;

configuring two ports for port protection, wherein the working and backup ports reside on a single ONU, or on different ONUs coupled by a switch; and configuring a 1-by-2 optical switch with one port coupled to the single ONU or different ONUs and the other two ports coupled to working and backup fibers.

16. The system of claim 15, wherein the working and backup ports reside on the single ONU, and wherein the system is further configured to support duplicating ONU traffic on both the working and backup ports.

17. The system of claim 15, wherein the working and backup ports reside on the single ONU, and wherein the system is further configured to:

detect failure on the working port and switch to the backup port, and monitor optical signals on the backup port to report backup path failure to the single ONU.

18. The system of claim 15, wherein the configuration mechanism is further configured to configure both the working and backup ports to be in an operating mode and share normal traffic load between the working and backup ports.

19. The system of claim 13, wherein the protection switching mechanism further comprises:

a timing mechanism configured to maintain a holdover timer at one of the ONUs;

a holdover mode at the one of the ONUs configured to be activated if the holdover timer is not expired; and a recovering mechanism at the one of the ONUs configured to recover from failure in the holdover mode without performing ranging, registration, or discovery.

20. The system of claim 13, further comprising a provisioning mechanism configured to provision the EPON with balanced trunk paths between the OLT and the ONUs to avoid range adjustment in protection switching.

21. The system of claim 13, wherein while performing critical link configuration, the switching mechanism is configured to apply range offset for protected path and direct registration with prioritized service discovery.

22. The system of claim 13, wherein the switching mechanism is further configured to perform protection switching on demand in response to a protection-switching command.

23. The system of claim 13, wherein the switching mechanism is further configured to switch automatically to the redundant line card.

24. A system configured to perform protection switching in an Ethernet passive optical network (EPON), comprising:

a failure detection mechanism configured to detect a failure of a network component and an associated type of failure;

a switching mechanism configured to switch to a redundant component, to reduce service disruption time in response to the failure detection mechanism detecting the failure, based on a detected type of the failure, wherein the switching includes:

determining the redundant component to use for protection switching based on the detected type of the failure, and preserving an existing configuration of the network component;

a configuration mechanism configured to configure the redundant component with the preserved existing configuration of the network component to recover network operation; and an optical line terminal (OLT) Internet protocol multicast (IPMC) proxy configured to:

allow downstream IPMC traffic to flow when switching occurs; and build a multicast group database by sending startup queries to discover multicast groups currently used by subscribers.

* * * * *